United States Patent
Williams et al.

(10) Patent No.: US 6,523,993 B2
(45) Date of Patent: Feb. 25, 2003

(54) BLENDER CLUTCH

(75) Inventors: Brian Williams, Midlothian, VA (US); Brian Sullivan, Richmond, VA (US)

(73) Assignee: Hamilton Beach/Proctor-Silex, Inc., Glen Allen, VA (US)

(*) Notice: Subject to any disclaimer, the term of this patent is extended or adjusted under 35 U.S.C. 154(b) by 89 days.

(21) Appl. No.: 09/819,625

(22) Filed: Mar. 29, 2001

(65) Prior Publication Data

US 2002/0141285 A1 Oct. 3, 2002

(51) Int. Cl.$^7$ .............................. A47J 43/046
(52) U.S. Cl. ................. 366/197; 366/205; 366/279; 241/282.2
(58) Field of Search ................. 366/205, 197, 366/279, 314; 241/282.1, 282.2

(56) References Cited

U.S. PATENT DOCUMENTS

| | | |
|---|---|---|
| 2,755,900 A | 7/1956 | Seyfried |
| 2,757,909 A | 8/1956 | Wayne |
| 2,992,715 A * | 7/1961 | Blachly |
| 3,540,234 A | 11/1970 | Raymond |
| 3,542,178 A | 11/1970 | Ripple |
| 3,596,692 A | 8/1971 | Swanke |
| 3,784,118 A | 1/1974 | Hurwitz |
| 4,462,694 A | 7/1984 | Ernster et al. |
| 5,368,390 A | 11/1994 | Gambrill et al. |
| 5,758,965 A | 6/1998 | Gambrill et al. |
| 5,779,359 A | 7/1998 | Gambrill et al. |

* cited by examiner

Primary Examiner—Joseph W. Drodge
(74) Attorney, Agent, or Firm—John H. Thomas, P.C.

(57) ABSTRACT

A coupling for a blender comprises first and second clutches. The first clutch is connected to a blender motor and is adapted to be rotatably driven by operation of the motor. The second clutch is connected to a rotatable cutter assembly inside a blender jar. The first and second clutches each comprise a plurality of teeth, and each tooth comprises a drive face. Each drive face has a negative draft.

14 Claims, 2 Drawing Sheets

BLENDER CLUTCH

This invention relates to a clutch used in a blender assembly for connecting the blender motor to the rotatable cutter assembly inside a blender jar.

BACKGROUND OF THE INVENTION

It is not uncommon for a user to turn on a blender and leave it unattended, even if just for a few seconds. If a blender jar is not secure or well-seated on its blender base, the blender jar can pop off and cause a mess.

In some high use environments, for instance, commercial settings, if a blender falls off its base, then there could be a spill and a waste of valuable time. Also, a user can misuse a blender assembly by, for instance, putting a jar on its motor housing/base and turning on the motor prematurely, or similarly, pulling the jar off of the base before the motor stops rotating. In addition to the potential mess that this could cause, these abusive practices could be damaging to the appliance. One area that is commonly damaged is the coupling made up of the two clutches where the clutch teeth can become chipped or even shear off.

Some efforts at solving the foregoing problems include clutches made of rubber and having vertical drive faces on the teeth of the clutches. A vertical drive face facilitates alignment of the clutch teeth upon mounting of a blender jar on the base. The trade-off is that the vertical drive face does not necessarily grip a jar onto the base as securely as possible.

SUMMARY OF THE INVENTION

Accordingly, it is an object of the present invention to solve the foregoing problems and provide a clutch having teeth wherein the drive face of those clutch teeth has a negative draft.

In one embodiment, a coupling for a blender comprises first and second clutches. The first clutch is connected to a blender motor and is adapted to be rotatably driven by operation of the motor. The second clutch is connected to a rotatable cutter assembly inside a blender jar. The first and second clutches each comprise a plurality of teeth, and each tooth comprises a drive face. Each drive face has a negative draft. In a further variation, the first and second clutches may be comprised of metal, including cast aluminum. Each clutch may comprise four teeth, with each tooth oriented on the clutch about 90° from its adjacent teeth. The negative draft of each drive face may be in the range of 1° to 10°. The negative draft may be approximately 5°. Still further, the negative draft of each drive face can be substantially the same.

In a further embodiment, a blender comprises a rotatable cutter assembly, a jar for receiving a material to be acted upon by said rotatable cutter assembly which is positioned within the jar, and a motor carried in a housing with a drive shaft. A coupling comprises first and second clutches. The first clutch is connected to the motor by the drive shaft and is adapted to be rotatably driven by operation of the motor. The second clutch is connected to a rotatable cutter assembly inside the jar. The first and second clutches each comprise a plurality of teeth, and each tooth comprises a drive face wherein each drive face has a negative draft. Alternatively, the first and second clutches may be comprised of metal, including cast aluminum. Each clutch may comprise four teeth, with each tooth oriented on the clutch about 90° from its adjacent teeth. The negative draft of each drive face can be in the range of 1° to 10°. Alternatively, the negative draft of each drive face can be approximately 5°. Still further, the negative draft of each drive face can be substantially the same.

DETAILED DESCRIPTION OF THE INVENTION

Figure 1:
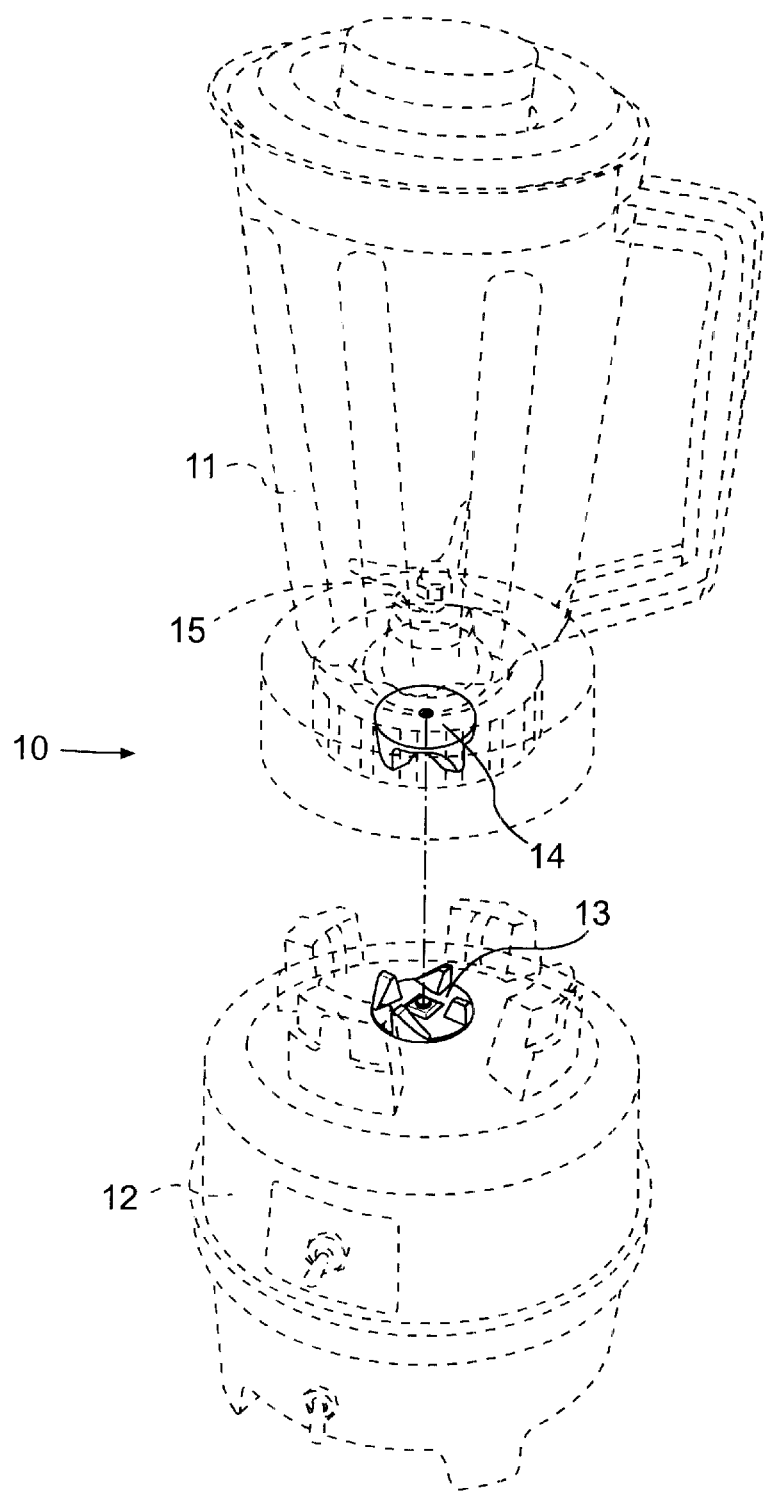
FIG. 1 is a partially exploded view of a blender wherein clutches of the present invention are shown, one attached to the blender jar, and the other attached to a blender motor housing.

Turning first to FIG. 1, there is shown a blender 10 that includes a blender jar 11 and blender motor housing 12 that are shown in dotted lines. Mounted within the blender jar 11 is a rotatable cutter assembly 15. The rotatable cutter assembly 15 is connected via a shaft (not shown) to a clutch 14. The clutch 14 is adapted to engage the clutch 13 that is mounted onto a drive shaft (not shown) that is rotated by a motor within the motor housing 12.

Figure 2:
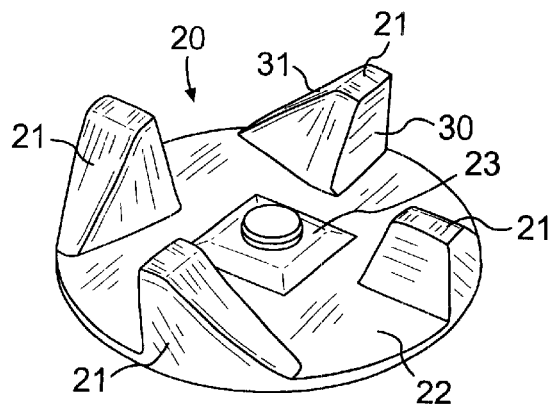
FIG. 2 is a perspective view of a clutch in accordance with the present invention.
Figure 3:
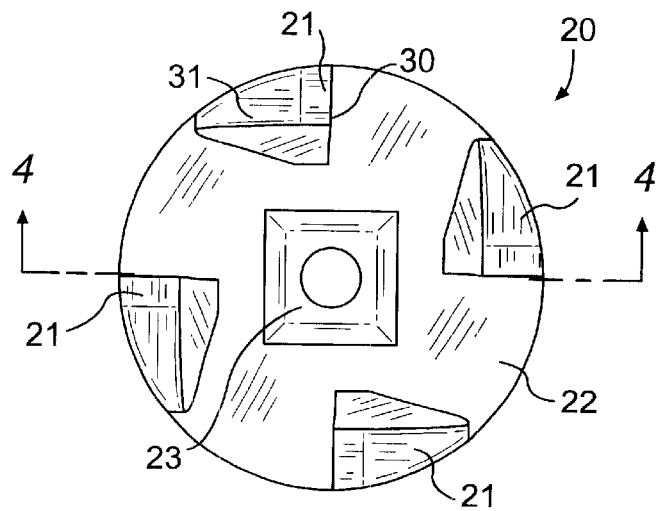
FIG. 3 is a top elevation view of a clutch in accordance with the present invention.
Figure 4:
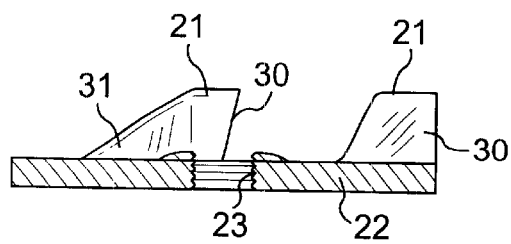
FIG. 4 is a cross sectional, side elevation view of a clutch in accordance with the present invention taken along the lines 4—4 shown in FIG. 3.

FIGS. 2 through 4 illustrate a clutch 20 that is the same as the clutches 13 and 14 shown in FIG. 1. The clutch 20 is made up of a circular plate 22 that has four teeth 21 protruding upwardly from the plane defined by the face of the plate. The center of the plate 22 is an internally threaded portion 23 that will attach the clutch 20 to a drive shaft attached to a blender motor or a shaft attached to a blender cutter assembly. Of course, any type of attachment design may be used to attach the clutch 20 to a shaft on a blender. The internally threaded portion 23 is preferred because it securely holds the clutch 20 in place yet still allows the clutch to be replaced by unscrewing it.

Each tooth 21 has a drive face 30 and a trailing support portion 31. The drive face 30 is adapted to engage a reciprocal drive face on a second clutch that is mounted on either the blender jar or the blender motor housing. The drive face 30 is typically flat in order to fully engage a reciprocal drive face on a reciprocal clutch. Alternatively, there may be slight serrations on a drive face to better encourage gripping when the reciprocal drive faces are engaged. The trailing support portion 31 angles downwardly from the side of the tooth opposite the drive face 30. The trailing support portion 31 offers support and integrity to the tooth. In a preferred embodiment, the angle of taper of the trailing support portion 31 is approximately 40°. The tooth 21 is approximately 0.5 cm in height and the thickness of the plate 22 is approximately 2 mm. In this preferred embodiment, the clutch 20 is made of cast aluminum. Other metals, composites, coatings and rubber may alternatively be used. Cast aluminum is preferred, because it is durable and because it is relatively easy to machine. Also, if a user of a blender tries to place a jar upon a moving clutch and a motor housing, then a substantial noise is created by the aluminum contact, which will discourage this type of abuse. This is a useful safety warning. Also, the use of a durable metal such as cast aluminum makes the clutch 20 more resistant to wear than other common materials such as rubber.

As seen most clearly in FIG. 4, the drive face 30 of the teeth 21 has a negative draft. That is, the portion of the drive face 30 furthest from the plate 22 extends out further than the base of the drive face adjacent the plate. Said another way, the drive face 30 forms an acute angle with the horizontal plane of the plate 22. The negative draft allows the reciprocal teeth in a pair of clutch plates to effectively lock in place upon rotation. This negative draft tightly engages the two clutches so that they are not easily separated. When attached in operation to a blender motor housing and to a bottom of a blender jar, this negative draft means that the blender jar will be better held in place. The most favorable draft is within the range of 1° to 10° from perpendicular to the horizontal plane of the plate 22. Preferably, the draft is approximately 5° as shown in FIG. 4. As shown, each tooth 21 has substantially the same negative draft, but there may be variations in the drafts depending on engineering design requirements. If there is too much negative draft, then the blender may be difficult to remove from the blender base. In addition to a greater stability, the negative draft can allow a designer to have the blender perform at a higher rpm with less fear of a blender jar becoming accidentally disengaged.

In the preferred embodiment shown in the attached figures, there are only four teeth 21 on the clutch 20 that are oriented on the clutch about 90° from adjacent teeth. This relative few number of teeth allows play between the teeth and a more simple alignment upon placing the blender jar onto the blender base. Accordingly, four teeth are preferred, but are not necessary —fewer or more may be used.

While the invention has been described with reference to specific embodiments thereof, it will be understood that numerous variations, modifications and additional embodiments are possible, and accordingly, all such variations, modifications, and embodiments are to be regarded as being within the spirit and scope of the invention.

What is claimed is:

1. A coupling for a blender comprising:
   first and second clutches,
   the first clutch connected to a motor and adapted to be rotatably driven by operation of the motor, and the second clutch connected to a rotatable cutter assembly inside a blender jar,
   wherein the first and second clutches each comprise a plurality of teeth and each tooth comprises a drive face, and
   further wherein each drive face has a negative draft.

2. A coupling for a blender as claimed in claim 1, wherein the first and second clutches are comprised of metal.

3. A coupling for a blender as claimed in claim 1, wherein the first and second clutches are comprised of cast aluminum.

4. A coupling for a blender as claimed in claim 1, wherein each clutch comprises four teeth, with each tooth oriented on the clutch about 90° from its adjacent teeth.

5. A coupling for a blender as claimed in claim 1, wherein the negative draft of each drive face is in the range of 1°–10°.

6. A coupling for a blender as claimed in claim 1, wherein the negative draft of each drive face is approximately 5°.

7. A coupling for a blender as claimed in claim 1, wherein the negative draft of each drive face is substantially the same.

8. A blender comprising:
   a rotatable cutter assembly,
   a jar for receiving a material to be acted upon by said rotatable cutter assembly which is positioned within said jar,
   a motor carried in a housing with a drive shaft,
   a coupling comprising first and second clutches,
   the first clutch connected to the motor by the drive shaft and adapted to be rotatably driven by operation of the motor, and the second clutch connected to a rotatable cutter assembly inside the jar,
   wherein the first and second clutches each comprise a plurality of teeth and each tooth comprises a drive face, and
   further wherein each drive face has a negative draft.

9. A blender as claimed in claim 8, wherein the first and second clutches are comprised of metal.

10. A blender as claimed in claim 9, wherein the first and second clutches are comprised of cast aluminum.

11. A blender as claimed in claim 8, wherein each clutch comprises four teeth, with each tooth oriented on the clutch about 90° from its adjacent teeth.

12. A blender as claimed in claim 8, wherein the negative draft of each drive face is in the range of 1°–10°.

13. A blender as claimed in claim 8, wherein the negative draft of each drive face is approximately 5°.

14. A blender as claimed in claim 8, wherein the negative draft of each drive face is substantially the same.

* * * * *